G. HART.
Harvester Cutter.
No. 7,700. Patented Oct. 8, 1850.
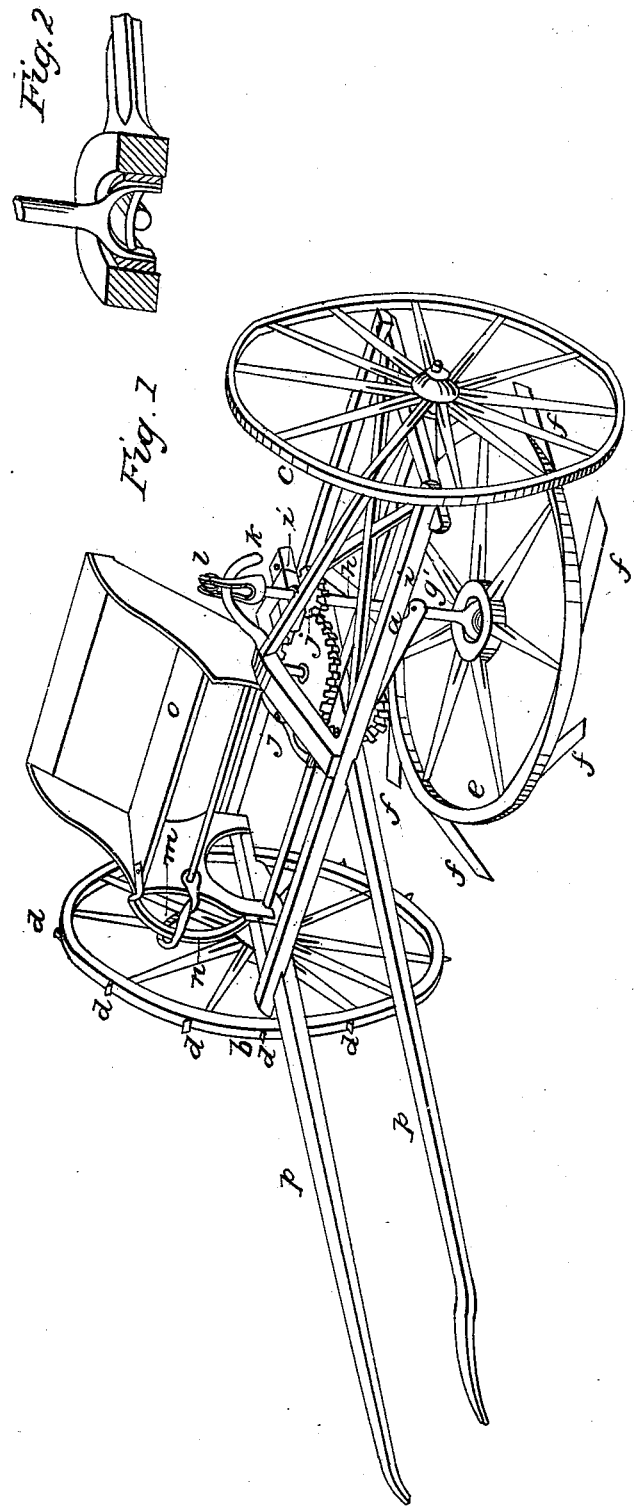

UNITED STATES PATENT OFFICE.

GEO. HART, OF DILLSBOROUGH, INDIANA.

IMPROVEMENT IN MOUNTING THE CUTTERS OF A MOWING-MACHINE.

Specification forming part of Letters Patent No. 7,700, dated October 8, 1850.

*To all whom it may concern:*

Be it known that I, GEORGE HART, of Dillsborough, in the county of Dearborn and State of Indiana, have invented new and useful Improvements in Mowing-Machines; and I do hereby declare the following to be a full, clear, and exact description of the nature, construction, and operation thereof, reference being had to the annexed drawings, making part of this specification.

The object of my invention is to construct a grass or grain cutter which shall adapt itself to the varying surface of the ground. This I do by placing a series of scythes or cutters in the perimeter of a wheel or disk which is hung at the center by a universal joint, and is adjustable to any required height by a quadrant-lever, which, actuated by an arm or treadle at the will of the operator, raises the wheel-shaft vertically from the ground.

The principal difficulty which has heretofore occurred in making reapers to be actuated by horse or other power has been that by the present method of cultivation the ground is left in so rough a state that the revolving cutter, unless set at a considerable height above the surface, is impeded by the inequalities. It is much better to cut the grain or grass near the surface of the ground, as it stands before the knife better, as well as making a greater yield of straw or hay, which is more or less of an object in all places. The action of this machine is such as that the cutting-blade is never permitted to run into the ground, but will be raised or depressed as it passes over the various inequalities, or, in case they should be of a character requiring it, may by the action of the quadrant be withdrawn at pleasure.

In the annexed drawings, Figure 1 is a perspective view of the machine. Fig. 2 is a perspective view, partly in section, of the joint by which the scythe-wheel is hung to the vertical shaft or axle.

Similar letters have reference to like parts in the several figures.

$a$ is the bed or frame of the machine. $b\ c$ are the running-wheels, one of which, $b$, is armed around its perimeter with spikes $d$ to insure its rotation. $e$ is a wheel which is armed around its perimeter with scythes $f$, so placed as to cut from heel to point. $g$ is a universal joint by which the wheel is attached to the shaft $h$. This shaft is capable of vertical motion in sockets $i$, attached to the frame, and is rotated by gearing $j$, connected with the running-gear. The shaft $h$ is capable of being suddenly raised out of the way of any obstacle by the cam K acting against a roller, $l$, in a swivel affixed to the shaft $h$, the said cam being operated by a winch convenient to the hand of the driver, the handle of such winch being retainable at any desired position by a pin, $m$, and segment $n$. $o$ is the box of the driver. $p$ are the shafts. The entire mowing-frame may, however, be placed in front of the team, if preferred.

Having thus fully described the nature of my invention, what I claim therein as new, and desire to secure by Letters Patent, is—

The method of constructing a revolving grass or grain cutter, so as to adapt itself to the varying surface of the ground, by means of hanging it by a universal joint on the end of a shaft adjustable vertically, substantially as herein described.

To the above specification of my improvement in mowing-machines I have set my hand this 8th day of April, 1850.

GEORGE HART.

Witnesses:
EDWARD H. KNIGHT,
ALANSON B. CLARK.